Figure 1:
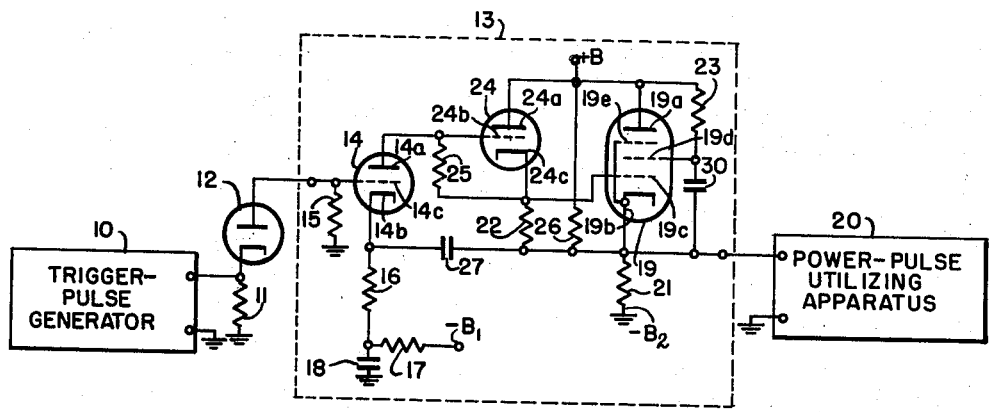

March 2, 1954

C. R. WILHELMSEN 2,671,172

REPETITIVE-PULSE GENERATOR

Filed Dec. 12, 1952

INVENTOR.
CARL R. WILHELMSEN
BY Laurence B. Dodds
ATTORNEY

Patented Mar. 2, 1954

2,671,172

UNITED STATES PATENT OFFICE 2,671,172

REPETITIVE-PULSE GENERATOR

Carl R. Wilhelmsen, Westbury, N. Y., assignor to Hazeltine Research, Inc., Chicago, Ill., a corporation of Illinois Application December 12, 1952, Serial No. 325,573

11 Claims. (Cl. 250—27)

General

This invention relates to repetitive-pulse generators of the triggered type and, more particularly, to generators which supply repetitive power pulses.

Repetitive-pulse generators of the triggered type are particularly useful for supplying power to, for example, test apparatus for radar equipment in applications where the test apparatus is only required to have a small duty cycle, that is, to operate during a small portion of a repetitive cycle. Such test apparatus may demand a large amount of power during short operating intervals but may have a required duty cycle of, for example, only ten per cent. of the repetitive cycle. Vast reductions in power consumption by the test apparatus and reductions in tube sizes and the sizes of other circuit components with consequent reductions of cost may, therefore, be accomplished by utilizing a pulse-type power supply which supplies power to the test apparatus only during the short required operating intervals thereof.

The power pulses supplied by such a pulse-type power supply should ordinarily have a predetermined potential polarity, for example, positive relative to a given reference. Also, the pulse-type power supply should ordinarily be capable of supplying larger amounts of power than pulse generators of a conventional type. Various circuits have heretofore been proposed for supplying such positive power pulses. Such circuits commonly require the use of a separate gating pulse generator, adding to the complexity and, hence, the cost of the power supply. In order to obtain a positive output pulse of sufficient power, one pulse-type power-supply circuit heretofore proposed utilizes a pulse transformer which also adds to the complexity and the cost of the power supply and, additionally, may not be commercially available.

It is an object of the present invention, therefore, to provide a new and improved repetitive-pulse generator of the triggered type which avoids one or more of the above-mentioned disadvantages and limitations of such circuits heretofore proposed.

It is another object of the present invention to provide a new and improved repetitive-pulse generator of the triggered type for supplying pulses of a predetermined polarity and one which is of relatively simple construction and does not utilize a pulse transformer.

It is another object of the present invention to provide a new and improved repetitive-pulse generator of the triggered type for supplying power pulses of positive polarity relative to a given reference.

It is another object of the present invention to provide a new and improved repetitive-pulse generator of the triggered type for supplying to a low-impedance load circuit power pulses of positive polarity relative to a given reference.

In accordance with a particular form of the invention, a generator of the triggered type for developing repetitive pulses comprises a potential-supply circuit having positive and negative terminals and a first electron-discharge device coupled to the aforesaid circuit and having an input circuit and conductive during the intervals between repetitive pulses. The generator also includes a second electron-discharge device having an anode coupled to the aforesaid positive terminal, a cathode coupled to the aforesaid negative terminal, a control electrode coupled to the above-mentioned first device, and an output circuit including a portion coupled between the aforesaid negative terminal and the aforesaid cathode. The second device is nonconductive during the above-mentioned intervals between the repetitive pulses. The generator also includes a repetitive-trigger-pulse supply circuit coupled to one of the aforesaid devices for repetitively causing the first device to be nonconductive and the second device to be conductive and impedance means exclusive of the aforesaid portion of the output circuit and coupled between the aforesaid control electrode and the aforesaid cathode for applying to the control electrode potential variations across the aforesaid portion of the output circuit. The generator also includes a time-constant feed-back network coupled to the output circuit of the second device and to the input circuit of the first device for controlling the durations of the nonconduction intervals of the first device and the conduction intervals of the second device, whereby the generator is effective to develop repetitive pulses in the aforesaid output circuit.

For a better understanding of the present invention, together with other and further objects thereof, reference is had to the following description taken in connection with the accompanying drawing, and its scope will be pointed out in the appended claims.

Figure 2:
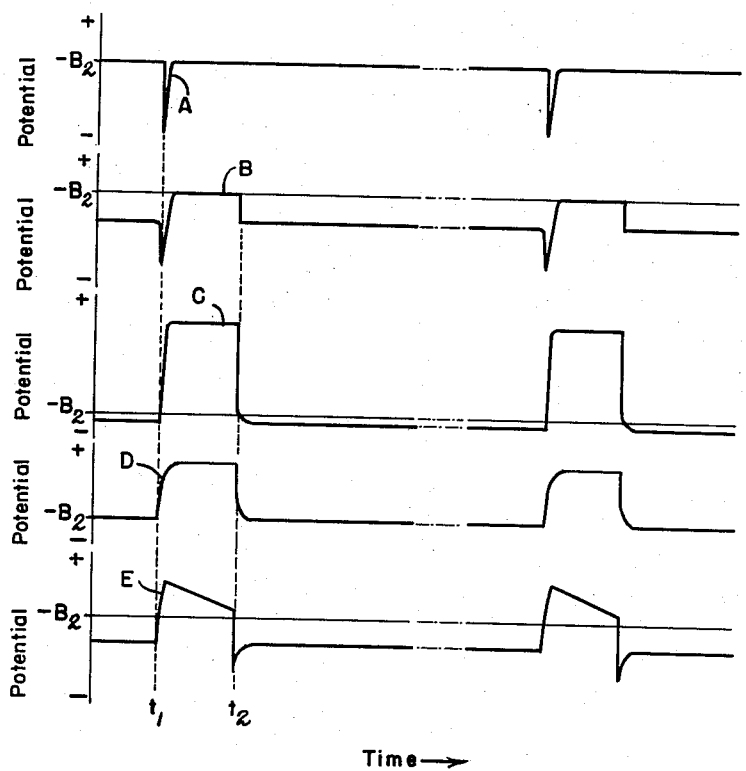

In the accompanying drawing:

Fig. 1 is a circuit diagram of equipment including a repetitive-pulse generator of the triggered type constructed in accordance with the invention, and Fig. 2 is a graph representing the potential-time characteristics of signals developed at various circuit points of the repetitive-pulse generator represented in Fig. 1.

Description of Fig. 1 equipment

Referring now more particularly to Fig. 1 of the drawing, there is represented equipment including a repetitive-pulse generator of the triggered type constructed in accordance with the invention. The equipment comprises, for example, radar test equipment including a trigger-pulse generator 10 which may be of conventional construction for generating, for example, negative trigger pulses of a predetermined frequency. There is connected across the output circuit of the generator 10 a cathode resistor 11 of a diode 12. The resistor 11 and the diode 12 are coupled to a repetitive-trigger-pulse supply circuit of a repetitive-pulse generator 13 for applying negative trigger pulses thereto and for preventing the application of, for example, stray positive pulses thereto which might interfere with the operation of the generator.

The repetitive-pulse generator 13 comprises a potential-supply circuit preferably having a positive terminal +B, a first negative terminal $-B_1$, and a second less negative terminal $-B_2$. A first electron-discharge device comprising, for example, an electron tube 14 of the triode type, preferably has an anode 14a coupled to the positive terminal +B through a series of resistors 25, 22, 26 to be described in detail subsequently, and a cathode 14b coupled to the negative terminal $-B_1$ through a cathode resistor 16 and a power-supply filter network comprising a decoupling resistor 17 and a filter condenser 18. The tube 14 preferably also includes a control electrode 14c coupled through a grid-leak resistor 15 to the cathode circuit thereof for developing, in a manner more fully explained hereinafter, an operating bias which maintains the tube 14 conductive during the intervals between repetitive pulses developed by the generator 13. The repetitive-trigger-pulse supply circuit of the generator 13 comprises the control electrode-cathode circuit just described for repetitively causing the tube 14 to be nonconductive upon the application of trigger pulses thereto.

The repetitive-pulse generator 13 also includes a second electron-discharge device nonconductive during the intervals between the repetitive pulses developed by the generator 13 and comprising, for example, an electron tube 19 of the pentode type, preferably having an anode 19a coupled to the positive terminal +B, a cathode 19b coupled to the second negative terminal $-B_2$ through a cathode resistor 21 and to the positive terminal +B through resistor 26, and a first control electrode 19c coupled through resistor 25 to the anode 14a of the first electron tube 14. The tube 19 preferably also includes a second control or screen electrode 19d coupled to the positive terminal +B through a resistor 23 and coupled to the cathode 19b by means of a condenser 30 connected to the electrode 19d and the cathode 19b. The time constant of the resistor 23 and the condenser 30 preferably is long with respect to the duration of each output pulse of the generator 13 to provide a long discharge time for the condenser 30. The tube 19 preferably also includes a suppressor electrode 19e connected to the cathode 19b in a conventional manner.

The second electron-discharge device comprising the tube 19 has, for example, an anode-cathode output circuit which includes a portion preferably coupled between the second negative terminal $-B_2$ and the cathode 19b. This portion of the output circuit effectively includes, for example, a load circuit including the cathode resistor 21 and having a predominantly resistive impedance comprising the input impedance of a power-pulse utilizing apparatus 20 which may, for example, be any apparatus utilizing repetitive power pulses for energization, such as radar test apparatus.

Impedance means exclusive of the above-mentioned portion 20, 21 of the output circuit of the tube 19 and comprising, for example, the resistor 22 preferably is coupled between the first control electrode 19c and the cathode 19b of the tube 19 for applying to the control electrode 19c potential variations across the above-mentioned portion 20, 21 of the output circuit of the tube 19. The previously described screen-electrode connections of the tube 19 also are such that the condenser 30 applies to the screen electrode 19d potential variations across the above-mentioned portion 20, 21 of the output circuit of the tube 19.

The repetitive-pulse generator 13 preferably also includes a third electron-discharge device comprising, for example, an electron tube 24 of the triode type, having an anode 24a coupled to the positive terminal +B, a control electrode 24b connected to the anode 14a of the tube 14, and a cathode 24c connected to the control electrode 19c of the tube 19 and coupled through a resistor 25 to the anode 14a of the tube 14. The control electrode 24b and the cathode 24c are coupled to the tube 14 for maintaining the third device 24 nonconductive during the intervals between repetitive pulses.

The tube 14, the resistors 16, 25, 22, 21, and 26 constitute a voltage divider which preferably is so proportioned as to maintain the tube 14 conductive during the intervals between repetitive pulses and the tubes 19 and 24 nonconductive during those intervals.

The repetitive-pulse generator 13 also includes a time-constant feed-back network coupled to the output circuit of the tube 19 and to the input circuit of the tube 14 for controlling the durations of the nonconduction intervals of the tube 14 and the conduction intervals of the tube 19. The time-constant network preferably comprises the cathode resistor 16 of the tube 14 and a condenser 27 coupled thereto and to the output circuit of the tube 19 for controlling an operating bias potential of the tube 14 and, thus, the duration of the nonconduction intervals thereof. The time-constant network 16, 27 preferably has a time constant approximately equal to one-tenth the period of the trigger pulses applied to the tube 14 to cause the generator 13 to develop repetitive pulses having a duration approximately equal to the above-mentioned time constant.

Operation of Fig. 1 equipment

Considering now the operation of the Fig. 1 equipment, the repetitive-pulse generator 13 is of the type which has a single stable operating mode. When the generator 13 operates in the stable mode, the tube 14 conducts, resulting in current flow from the positive terminal +B through the resistors 26, 22, 25, the tube 14, and resistors 16, 17 to the negative terminal $-B_1$. The cathode 14b of the tube 14 then is at a positive potential with respect to the terminal $-B_1$ but at a negative potential with respect to the terminal $-B_2$. Hence, control electrode-cathode current flows in the tube 14, driving the control-electrode potential negative relative to the terminal —$B_2$ and maintaining about zero operating bias on the tube.

The current flow through the resistor 25 develops a sufficient negative potential thereacross to bias the tube 24 beyond cutoff. Similarly, current flow through the resistor 22 develops a sufficient negative potential to bias the tube 19 beyond cutoff. The voltage divider comprising resistors 16, 25, 22, 26, 21 and the tube 14 preferably is so proportioned that no current flows through the resistor 21 or the effective input impedance of the apparatus 20, causing the cathode 19b of the tube 19 to assume the potential of the terminal —$B_2$. The condenser 30 connected between the screen electrode 19d and the cathode 19b of the tube 19 is charged to the potential difference between the terminals +B and —$B_2$. The repetitive-pulse generator 13 stably operates in this manner until the trigger-pulse generator 10 supplies a negative trigger pulse thereto.

Referring now to the curves of Fig. 2 which represent the potential-time characteristics of signals developed at various points of the Fig. 1 equipment upon the application of periodic trigger pulses thereto, curve A represents periodic negative trigger output pulses of the generator 10 developed across the resistor 11. At time $t_1$, the first pulse of curve A drives the cathode of the diode 12 sufficiently negative to render the diode conductive. Current flow through the diode causes the potential at the control electrode 14c of the tube 14 to become highly negative relative to the potential at the cathode 14b, thereby biasing the tube 14 beyond cutoff, as indicated by curve B which represents the potential developed at the control electrode 14c of the tube 14.

When the tube 14 becomes nonconductive, current ceases to flow through the resistor 25 with the result that the tube 24 conducts, operating with zero control electrode-cathode bias. Current then flows from the source terminal +B through the tube 24, the parallel circuit including the first control electrode-cathode impedance of the tube 19 and the resistor 22, and the parallel circuit including the resistor 21 and the effective input impedance of the power-pulse utilizing apparatus 20. Thus, at this time current flows through the resistor 22 in a reverse direction relative to current flow therethrough when the tube 14 is conductive. Accordingly, the potential at the cathode 24c of the tube 24 and the control electrode 19c of the tube 19 rises, as indicated by curve C of Fig. 2, rendering the tube 19 conductive. Current then flows from the source +B through the tube 19 and the parallel circuit including the resistor 21 and the effective input impedance of the power-pulse utilizing apparatus.

The resistor-condenser network 16, 27 applies the rise in potential across the resistor 21 to the cathode of the tube 14 effectively to increase the negative control electrode-cathode bias thereacross. This application of the signal developed in the output circuit of the tube 19 to the input circuit of the tube 14 is in the nature of a regenerative feed-back action and aids in causing the tube 14 sharply to become nonconductive at the time $t_1$. After the trigger pulse represented by curve A drives the control electrode 14c negative, because the tube 14 is nonconductive, control electrode-cathode current ceases to flow through the tube and the control-electrode potential of the tube 14 rises to the potential of the terminal —$B_2$, where it remains as indicated by curve B until a time $t_2$ for reasons to be explained subsequently.

Similarly, because of the regenerative action of the generator 13, the potential at the control electrode 19c, represented by curve C, rises sharply when the tube 19 initially becomes conductive. Accordingly, the potential at the cathode 19b of the tube 19 also rises sharply, as indicated by curve D which represents the output pulses developed across the effective input impedance of the power-pulse utilizing apparatus 20.

Because of the long time constant of the condenser 30 and resistor 23, the condenser 30 applies the rise in potential at the cathode 19b to the screen electrode 19d of the tube 19 in the manner of operation of a so-called "boot-strap" circuit. The resistor 22 also applies the rise in potential of the cathode 19b to the control electrode 19c in the manner of a "boot-strap" circuit or, in other words, under given load conditions the potential drop across the resistor 22 remains substantially constant notwithstanding that the cathode potential rises. Because of pentode-tube characteristics, the tube 19 can operate at high current levels with relatively low anode-cathode potential difference so long as a relatively high screen electrode-cathode potential difference is maintained. Accordingly, since the potentials of the screen electrode 19d, the control electrode 19c, and the cathode 19b of the tube 19 rise at the time $t_1$ by substantially the same amounts, amplification of the signal developed across the resistor 22 occurs in the output circuit of the tube 19. The tube 19, therefore, is capable of supplying for the duration of the output pulse a large value of current flow at a relatively high potential to the power-pulse utilizing apparatus 20.

When the cathode potential of the tube 19 rises sufficiently that any further tendency to increase is counteracted by a tendency of anode-cathode current flow to decrease substantially, as a result of the reduction of the anode-cathode potential difference below those values in which variations thereof do not substantially affect current flow, a fixed maximum value of current flows through the resistor 21 and the power-pulse utilizing apparatus 20 for a time interval determined in a manner presently to be explained.

As mentioned previously, at the time $t_1$, the rise in potential across the cathode resistor 21 is applied by the resistor-condenser network 16, 27 to the cathode 14b of the tube 14. When the potential drop across the resistor 21 reaches a stable value, the condenser 27 is charged by current flow from the source +B through the tube 19, the condenser 27, the resistor 16, and the condenser 18 to the terminal —$B_1$. This current flow initially is large, causing a large potential drop across the resistor 16 and thereby maintaining the cathode 14b of the tube 14 positive with respect to the potential at the terminal —$B_2$, as indicated by curve E which represents the potential at the cathode 14b. In accordance with the time constant of the resistor-condenser network 16, 27, however, the current flow decreases and the potential at the cathode 14b of the tube 14 falls accordingly until the control electrode-cathode potential difference is sufficiently small to render the tube 14 conductive at a time $t_2$ indicated in Fig. 2. The potential at the cathode 14b is represented by curve E as decreasing approximately linearly because the time constant of the resistor-condenser network 16, 27 preferably is sufficiently long relative to the time interval $t_1$—$t_2$ that the exponential decrease approximates a linear decrease during that interval to ensure a rapid rate of change of potential at the cathode 14b as the potential falls to the cutoff level of the tube 14. As a result, variations in output voltage caused by variations in loading do not substantially affect the duration of the time interval $t_1$—$t_2$.

When the tube 14 becomes conductive, the generator 13 rapidly returns to its stable operating mode as a result of current flow through the tube 14 which renders the tubes 24 and 19 nonconductive. Because of the regenerative nature of the feedback from the cathode of the tube 19 to the cathode of the tube 14, the changes in operating modes of the generator occur sharply with the result that the output pulse developed across the effective input impedance of the power-pulse utilizing apparatus 20 has a relatively sharp trailing edge.

The generator 13 then remains in its stable operating mode until the occurrence of the next repetitive trigger pulse supplied by the generator 10 which initiates a cycle of operation similar to that just explained.

The repetitive-pulse generator 13 has the highly desirable feature that variations in loading cause compensatory variations in the driving potential applied to the control electrode-cathode circuit of the tube 19 which enable the supply circuit +B, —B2 to supply variable values of current flow through the tube 19 to meet varying load requirements. For example, if the effective input impedance of the power-pulse utilizing apparatus 20 decreases, a larger value of current flows from the terminal +B through the tube 24, the resistor 22, and the apparatus 20. The potential drop across the resistor 22, therefore, increases, causing the potential at the control electrode 19c of the tube 19 to rise relative to the potential at the cathode 19b. Accordingly, the effective impedance of the tube 19 becomes less and the supply circuit +B, —B2 supplies higher values of current through the tube 19. In this manner, variations in loading by the power-pulse utilizing apparatus 20 cause changes in the operating bias of the tube 19 and facilitate the supply of the required current flow by the generator 13 at an approximately constant output potential.

While applicant does not wish to be limited to any particular circuit constants, the following have been employed in a repetitive-pulse generator constructed in accordance with the invention:

| | |
|---|---|
| Tube 14 | ½ section of type 5670. |
| Tube 19 | Type 6005. |
| Tube 24 | ½ section of type 5670. |
| Resistor 15 | 470 kilohms. |
| Resistor 16 | 15 kilohms. |
| Resistor 17 | 3300 ohms. |
| Resistor 21 | 22 kilohms. |
| Resistor 22 | 39 kilohms. |
| Resistor 23 | 68 kilohms. |
| Resistor 25 | 15 kilohms. |
| Resistor 26 | 180 kilohms. |
| Condenser 18 | .5 microfarad. |
| Condenser 27 | .02 microfarad. |
| Condenser 30 | .5 microfarad. |
| Effective input impedance of power-pulse utilizing apparatus | About 900 ohms. |
| Pulse potential at cathode 19b | About 180 volts. |
| Load circuit current flow during pulse | About 200 milliamperes. |
| Time interval $t_1$—$t_2$ | About 220 microseconds. |
| Over-all operating period | About 4000 microseconds. |
| Potential at terminal +B relative to potential at terminal —B2 | +315 volts. |
| Potential at terminal —B1 relative to potential at terminal —B2 | —105 volts. |

From the foregoing description of the invention, it will be apparent that a repetitive-pulse generator embodying the invention has the advantage of being relatively simple in construction yet capable of supplying greater power and a higher value of current flow of predetermined polarity to a low-impedance power-pulse utilizing apparatus than could heretofore readily be provided by a repetitive-pulse generator of simple construction.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A generator of the triggered type for developing repetitive power pulses comprising: a potential-supply circuit having a positive terminal, a first negative terminal, and a second less negative terminal; a first electron-discharge device having an anode-cathode circuit coupled to said positive terminal and said first negative terminal and having a control electrode-cathode input circuit including a cathode resistor and conductive during the intervals between said repetitive pulses; a second electron-discharge device having an anode coupled to said positive terminal, a cathode coupled to said second negative terminal, a first control electrode coupled to said first device, a second control electrode coupled to said positive terminal, and an output circuit which is coupled to said anode and said cathode of said second device and effectively includes a load circuit having a predominantly resistive impedance coupled between said second negative terminal and said cathode of said second device, said second device being nonconductive during said intervals between said repetitive pulses; a circuit including said input circuit of said first device for supplying periodic trigger pulses periodically to cause said first device to be nonconductive and said second device to be conductive; a resistor connected between said first control electrode and said cathode of said second device for applying to said first control electrode thereof potential variations across said load circuit; a condenser coupled between said second control electrode and said cathode of said second device for applying to said second control electrode thereof potential variations across said load circuit; and a time-constant feed-back network comprising said cathode resistor of said first device and a condenser coupled thereto and to said output circuit of said second device and having a time constant approximately equal to one-tenth the period of said trigger pulses for controlling an operating bias potential of said first device and thus the durations of the nonconduction intervals of said first device and the conduction intervals of said second device, whereby the generator is effective to develop repetitive power pulses in said output circuit.

2. A generator of the triggered type for developing repetitive pulses comprising: a potential-supply circuit having positive and negative terminals; a first electron-discharge device coupled to said circuit and having an input circuit and conductive during the intervals between said repetitive pulses; a second electron-discharge device having an anode coupled to said positive terminal, a cathode coupled to said negative terminal, a control electrode coupled to said first device, and an output circuit including a portion coupled between said negative terminal and said cathode, said second device being nonconductive during said intervals between said repetitive pulses; a repetitive-trigger-pulse supply circuit coupled to one of said devices for repetitively causing said first device to be nonconductive and said second device to be conductive; impedance means exclusive of said portion of said output circuit and coupled between said control electrode and said cathode for applying to said control electrode potential variations across said portion of said output circuit; and a time-constant feed-back network coupled to said output circuit of said second device and to said input circuit of said first device for controlling the durations of the nonconduction intervals of said first device and the conduction intervals of said second device, whereby the generator is effective to develop said repetitive pulses in said output circuit.

3. A generator of the triggered type for developing repetitive pulses comprising: a potential-supply circuit having a positive terminal, a first negative terminal and a second less negative terminal; a first electron-discharge device coupled to said positive terminal and said first negative terminal and having an input circuit and conductive during the intervals between said repetitive pulses; a second electron-discharge device having an anode coupled to said positive terminal, a cathode coupled to said second negative terminal, a control electrode coupled to said first device, and an output circuit including a portion coupled between said second negative terminal and said cathode, said second device being nonconductive during said intervals between said repetitive pulses; a repetitive-trigger-pulse supply circuit coupled to one of said devices for repetitively causing said first device to be nonconductive and said second device to be conductive; impedance means exclusive of said portion of said output circuit and coupled between said control electrode and said cathode for applying to said control electrode potential variations across said portion of said output circuit; and a time-constant feed-back network coupled to said output circuit of said second device and to said input circuit of said first device for controlling the durations of the nonconduction intervals of said first device and the conduction intervals of said second device, whereby the generator is effective to develop said repetitive pulses in said output circuit.

4. A generator of the triggered type for developing repetitive pulses comprising: a potential-supply circuit having positive and negative terminals; a first electron-discharge device coupled to said circuit and having an input circuit and conductive during the intervals between said repetitive pulses; a second electron-discharge device having an anode coupled to said positive terminal, a cathode coupled to said negative terminal, a first control electrode coupled to said first device, a second control electrode coupled to said positive terminal, and an output circuit including a portion coupled between said negative terminal and said cathode, said second device being nonconductive during said intervals between said repetitive pulses; a repetitive-trigger-pulse supply circuit coupled to one of said devices for repetitively causing said first device to be nonconductive and said second device to be conductive; impedance means exclusive of said portion of said output circuit and coupled between said first control electrode and said cathode for applying to said first control electrode potential variations across said portion of said output circuit; a condenser coupled between said second control electrode and said cathode for applying to said second control electrode potential variations across said portion of said output circuit; and a time-constant feed-back network coupled to said output circuit of said second device and to said input circuit of said first device for controlling the durations of the nonconduction intervals of said first device and the conduction intervals of said second device, whereby the generator is effective to develop said repetitive pulses in said output circuit.

5. A generator of the triggered type for developing repetitive power pulses comprising: a potential-supply circuit having positive and negative terminals; a first electron-discharge device coupled to said circuit and having an input circuit and conductive during the intervals between said repetitive pulses; a second electron-discharge device having an anode coupled to said positive terminal, a cathode coupled to said negative terminal, a control electrode coupled to said first device, and an output circuit which is coupled to said anode and said cathode and effectively includes a load circuit having a predominantly resistive impedance coupled between said negative terminal and said cathode, said second device being nonconductive during said intervals between said repetitive pulses; a repetitive-trigger-pulse supply circuit coupled to one of said devices for repetitively causing said first device to be nonconductive and said second device to be conductive; impedance means exclusive of said load circuit coupled between said control electrode and said cathode for applying to said control electrode potential variations across said load circuit; and a time-constant feed-back network coupled to said output circuit of said second device and to said input circuit of said first device for controlling the durations of the nonconduction intervals of said first device and the conduction intervals of said second device, whereby the generator is effective to develop said repetitive power pulses across said load circuit.

6. A generator of the triggered type for developing repetitive pulses comprising: a potential-supply circuit having positive and negative terminals; a first electron-discharge device coupled to said circuit and having an input circuit and conductive during the intervals between said repetitive pulses; a second electron-discharge device having an anode coupled to said positive terminal, a cathode coupled to said negative terminal, a control electrode coupled to said first device; and an output circuit including a portion coupled between said negative terminal and said cathode, said second device being nonconductive during said intervals between said repetitive pulses; a repetitive-trigger-pulse supply circuit including said input circuit of said first device for repetitively causing said first device to be nonconductive and said second device to be conductive; impedance means exclusive of said portion of said output circuit and coupled between said control electrode and said cathode for applying to said control electrode potential variations across said portion of said output circuit; and a time-constant feed-back network coupled to said output circuit of said second device and to said input circuit of said first device for controlling the durations of the nonconduction intervals of said first device and the conduction intervals of said second device, whereby the generator is effective to develop said repetitive pulses in said output circuit.

7. A generator of the triggered type for developing repetitive pulses comprising: a potential-supply circuit having positive and negative terminals; a first electron-discharge device coupled to said circuit and having an input circuit and conductive during the intervals between said repetitive pulses; a second electron-discharge device having an anode coupled to said positive terminal, a cathode coupled to said negative terminal, a control electrode coupled to said first device, and an output circuit including a portion coupled between said negative terminal and said cathode, said second device being nonconductive during said intervals between said repetitive pulses; a repetitive-trigger-pulse supply circuit coupled to one of said devices for repetitively causing said first device to be nonconductive and said second device to be conductive; a resistor connected between said control electrode and said cathode for applying to said control electrode potential variations across said portion of said output circuit; and a time-constant feed-back network coupled to said output circuit of said second device and to said input circuit of said first device for controlling the durations of the nonconduction intervals of said first device and the conduction intervals of said second device, whereby the generator is effective to develop said repetitive pulses in said output circuit.

8. A generator of the triggered type for developing repetitive pulses comprising: a potential-supply circuit having positive and negative terminals; a first electron-discharge device having an anode-cathode circuit coupled to said potential-supply circuit and having a control electrode-cathode input circuit including a cathode resistor, said device being conductive during the intervals between said repetitive pulses; a second electron-discharge device having an anode coupled to said positive terminal, a cathode coupled to said negative terminal, a control electrode coupled to said first device, and an output circuit including a portion coupled between said negative terminal and said cathode of said second device, said second device being nonconductive during said intervals between said repetitive pulses; a repetitive-trigger-pulse supply circuit coupled to one of said devices for repetitively causing said first device to be nonconductive and said second device to be conductive; impedance means exclusive of said portion of said output circuit and coupled between said control electrode and said cathode of said second device for applying to said control electrode thereof potential variations across said portion of said output circuit; and a time-constant feedback network comprising said cathode resistor of said first device and a condenser coupled thereto and to said output circuit of said second device for controlling an operating bias potential of said first device and thus the durations of the nonconduction intervals of said first device and the conduction intervals of said second device, whereby the generator is effective to develop said repetitive pulses in said output circuit.

9. A generator of the triggered type for developing repetitive pulses comprising: a potential-supply circuit having positive and negative terminals; a first electron-discharge device coupled to said circuit and having an input circuit and conductive during the intervals between said repetitive pulses; a second electron-discharge device having an anode coupled to said positive terminal, a cathode coupled to said negative terminal, a control electrode coupled to said first device, and an output circuit including a portion coupled between said negative terminal and said cathode, said second device being nonconductive during said intervals between said repetitive pulses; a circuit coupled to one of said devices for supplying periodic trigger pulses periodically to cause said first device to be nonconductive and said second device to be conductive; impedance means exclusive of said portion of said output circuit and coupled between said control electrode and said cathode for applying to said control electrode potential variations across said portion of said output circuit; and a time-constant feedback network coupled to said output circuit of said second device and to said input circuit of said first device and having a time constant approximately equal to one-tenth the period of said trigger pulses for controlling the durations of the nonconduction intervals of said first device and the conduction intervals of said second device, whereby the generator is effective to develop in said output circuit repetitive pulses having a duration approximately equal to said time constant.

10. A generator of the triggered type for developing repetitive pulses comprising: a potential-supply circuit having positive and negative terminals; a first electron-discharge device coupled to said circuit and having a control electrode-cathode input circuit and conductive during the intervals between said repetitive pulses; a second electron-discharge device having an anode coupled to said positive terminal, a cathode coupled to said negative terminal, a control electrode coupled to said first device, and an output circuit including a portion coupled between said negative terminal and said cathode of said second device, said second device being nonconductive during said intervals between said repetitive pulses; a third electron-discharge device having an anode coupled to said positive terminal, a cathode coupled to said control electrode of said first device, and a control electrode, said control electrode and said cathode of said third device being coupled to said first device for maintaining said third device nonconductive during said intervals between said repetitive pulses; a repetitive-trigger-pulse supply circuit coupled to one of said devices for repetitively causing said first device to be nonconductive and said second and third devices to be conductive; impedance means exclusive of said portion of said output circuit and coupled between said control electrode and said cathode of said second device for applying to said control electrode thereof potential variations across said portion of said output circuit; and a time-constant feedback network coupled to said output circuit of said second device and to said input circuit of said first device for controlling the durations of the nonconduction intervals of said first device and the conduction intervals of said second and third devices, whereby the generator is effective to develop said repetitive pulses in said output circuit.

11. A generator of the triggered type for developing repetitive pulses comprising: a potential-supply circuit having a positive terminal, a first negative terminal, and a second less negative terminal; a first electron-discharge device coupled to said circuit and having a control electrode-cathode input circuit including a first resistor coupled to said first negative terminal; a second electron-discharge device having an anode coupled to said positive terminal, a cathode coupled to said second negative terminal, a control electrode coupled to said first device, and an output circuit including a second resistor coupled between said second negative terminal and said cathode of said second device; a third resistor connected between said control electrode and said cathode of said second device for applying to said control electrode thereof potential variations across said second resistor; a third electron-discharge device having an anode coupled to said positive terminal, a cathode coupled to said control electrode of said first device, and a control electrode; a voltage divider including said first device, said three resistors, a resistor coupled between said control electrode and said cathode of said third device, a resistor network coupled between said cathode of said third device and said positive terminal and coupled to said second resistor, said voltage divider being so proportioned as to maintain said first device conductive during the intervals between said repetitive pulses and said second and third devices nonconductive during said intervals; a repetitive-trigger-pulse supply circuit coupled to one of said devices for repetitively causing said first device to be nonconductive and said second and third devices to be conductive; and a time-constant feed-back network coupled to said output circuit of said second device and to said input circuit of said first device for controlling the durations of the nonconduction intervals of said first device and the conduction intervals of said second and third devices, whereby the generator is effective to develop said repetitive pulses in said output circuit.

CARL R. WILHELMSEN.

References Cited in the file of this patent
UNITED STATES PATENTS

| Number | Name | Date |
|---|---|---|
| 2,640,153 | McCurdy | May 26, 1953 |